United States Patent [19]
Wilwerding

[11] 4,059,758
[45] Nov. 22, 1977

[54] AUTOFOCUS SYSTEM

[75] Inventor: Dennis J. Wilwerding, Littleton, Colo.

[73] Assignee: Honeywell Inc., Minneapolis, Minn.

[21] Appl. No.: 730,489

[22] Filed: Oct. 7, 1976

[51] Int. Cl.² .............................................. G01J 1/20
[52] U.S. Cl. .................................. 250/201; 250/204; 354/25; 356/4
[58] Field of Search ............... 250/201, 204, 209, 234, 250/235; 354/25; 356/1, 4, 5

[56] References Cited
U.S. PATENT DOCUMENTS

| 3,736,057 | 5/1973 | Harvey | 356/4 |
| 3,967,110 | 6/1976 | Rogers et al. | 250/201 |
| 4,004,852 | 1/1977 | Pentecost | 354/25 |
| 4,011,446 | 3/1977 | Swanberg | 250/201 |

Primary Examiner—David C. Nelms
Attorney, Agent, or Firm—H. L. Hanson; C. J. Ungemach

[57] ABSTRACT

An automatic single focus system of the spatial image correlation type uses two scans to position the primary lens. During a first scan, the amplitude of the major extremum in the correlation signal is stored. During the second scan, this stored amplitude is used to pick out the point of best focus.

13 Claims, 9 Drawing Figures

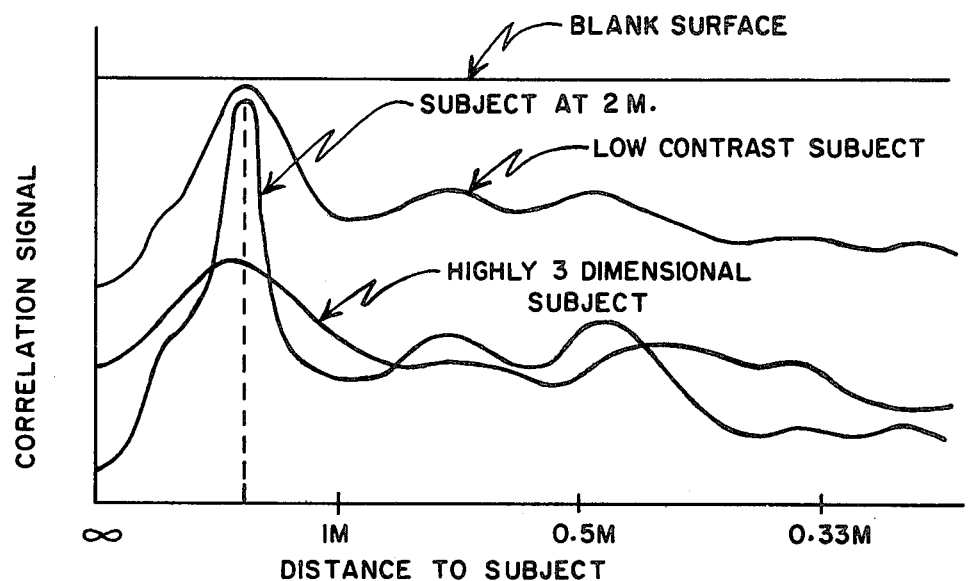
FIG. 3
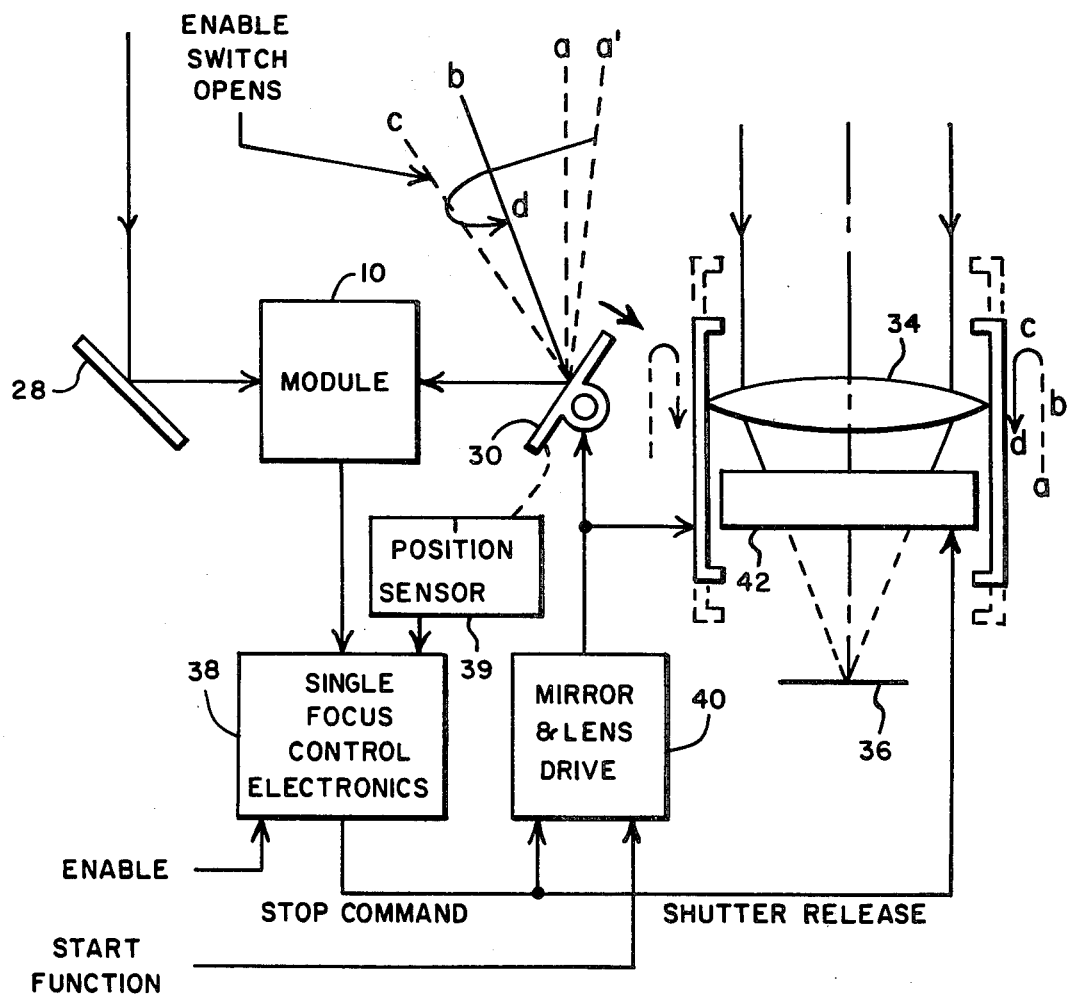
FIG. 4 SINGLE FOCUS SYSTEM

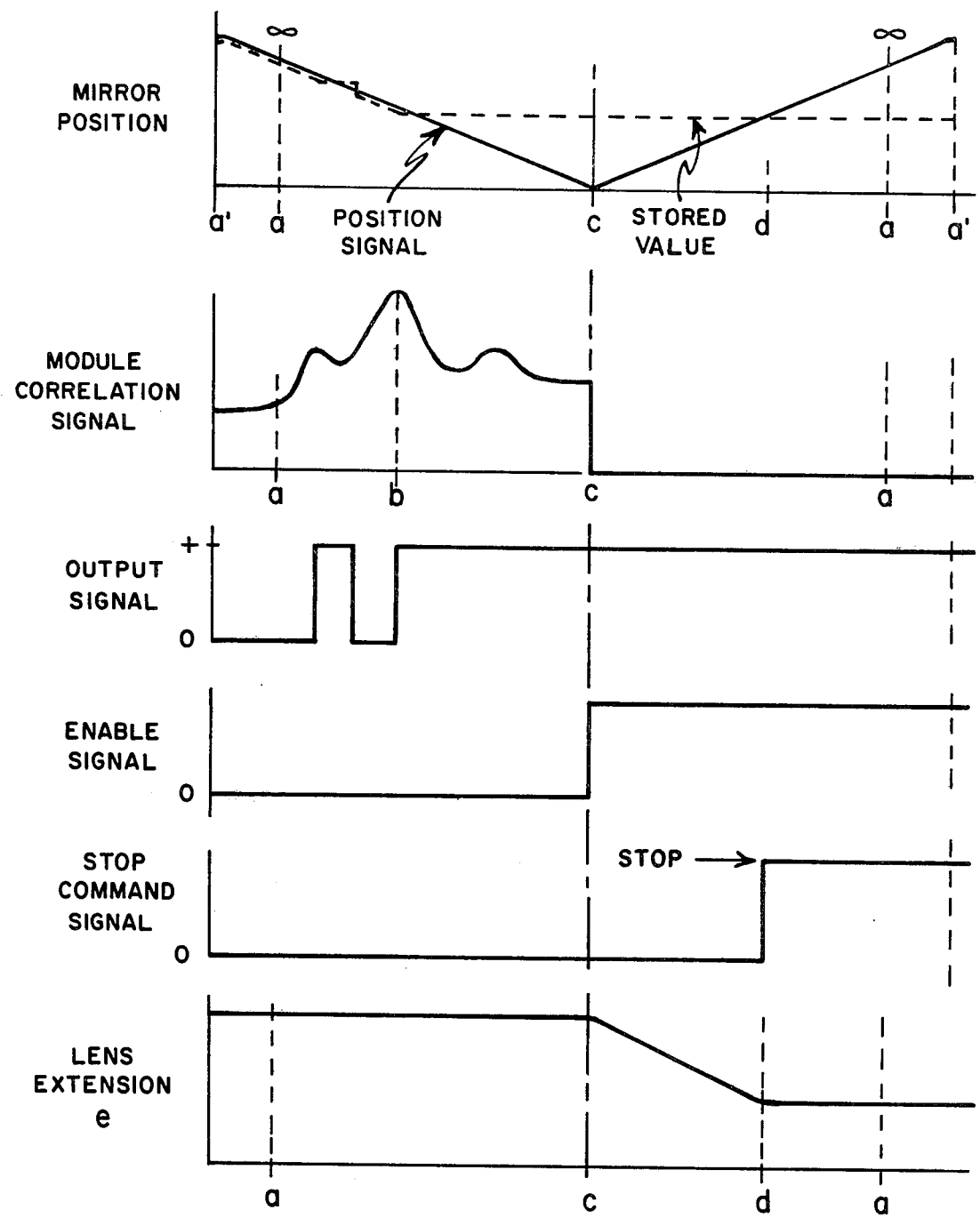
FIG. 5 WAVEFORMS — SINGLE FOCUS SYSTEM

4,059,758

AUTOFOCUS SYSTEM

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in copending U.S. patent applications Ser. No. 627,607, filed Oct. 31, 1975 and Ser. No. 700,963 filed June 29, 1976 by Norman L. Stauffer, and Ser. No. 728,567 filed Oct. 1, 1976 by Dennis J. Wilwerding, which are assigned to the same assignee as the present application, in U.S. Pat. Nos. 3,836,772, 3,838,275, and 3,958,117 by Norman L. Stauffer, and in U.S. Pat. No. 3,274,914 by Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object-to-apparatus distance.

The relative movement of the auxiliary optical element and the detector array occurs for each distance measuring or focusing operation. The critical condition occurs when there is best correspondence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object-to-apparatus distance. The position of the auxiliary optical element at the time of best correspondence is used in some manner to control the position of the primary optical element, such as a camera taking lens.

In the previously mentioned co-pending application Ser. No. 700,963 by Norman L. Stauffer, the correlation signal includes a major peak which is indicative of the distance to an object. A peak detector is used to determine this major peak. A single, complete scan of all focus zones is provided to insure that the highest correlation is achieved. The location of the last and, therefore, highest peak detected corresponds to the desired focus position.

In the previously mentioned co-pending application Ser. No. 728,567 by Dennis J. Wilwerding, a "dual scan" technique is used. During a first scan, the amplitude of the major peak in the correlation signal is stored. During the second scan, this stored amplitude is used to pick out only the major peak and, therefore, the point of best focus.

Although these systems are generally satisfactory and in many cases highly desirable, there is a continuing need for an automatic focus system utilizing a minimum of components. This is particularly important in systems for low cost still cameras. In addition, it is desirable to have a system which does not require that scanning mirror motion be linear or well predicted in time.

SUMMARY OF THE INVENTION

The system of the present invention is a distance determining and automatic focusing system which provides reliable performance with a minimum number of components. The system includes range sensing means, position sensing means, storing means, lens drive means, scanning means and focus control means.

The scanning means provides first and second scans of an image of an object. The range sensing means provides a correlation signal which has a major extremum during the first scan which is indicative of the distance to the object. The position sensing means provides a position signal indicative of the position of the scanning means. When the major extremum occurs during the first scan, the storing means stores the value of the position signal. During the second scan, the lens drive means drives a lens means, such as the taking lens of a camera, in a predetermined relationship with the scanning means. The focus control means halts motion of the lens means during the second scan when the position signal attains the value stored by the storing means.

BRIEF DESCRIPTION OF THE DRAWINGS

FIG. 3 shows the correlation signal as a function of distance to the subject for several different conditions.

FIG. 4 shows a single focus system for a still camera.

FIG. 5 shows waveforms associated with the operation of the system of FIG. 4.

DETAILED DESCRIPTION OF THE PREFERRED EMBODIMENTS

Image Correlation Range Sensing Means

Figure 1:
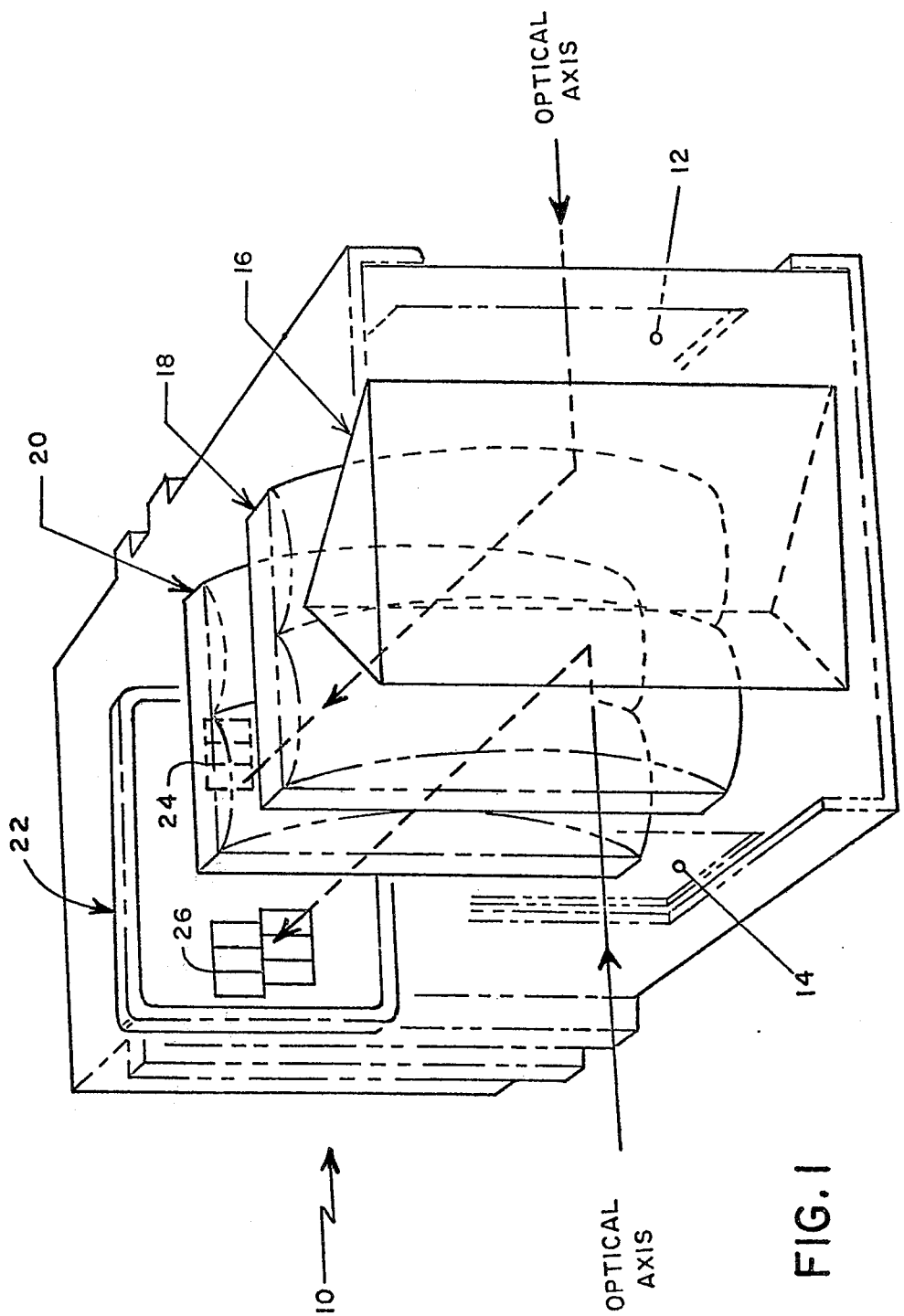
FIG. 1 shows a spatial image correlation range sensing module which may be used in conjunction with the dual scan automatic focus system of the present invention.

FIG. 1 shows one particularly advantageous form of image correlation range sensing means which may be used in the automatic focus system of the present invention. A more detailed description of this modular form of range sensing means may be found in the co-pending application by Norman L. Stauffer, Ser. No. 627,607.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
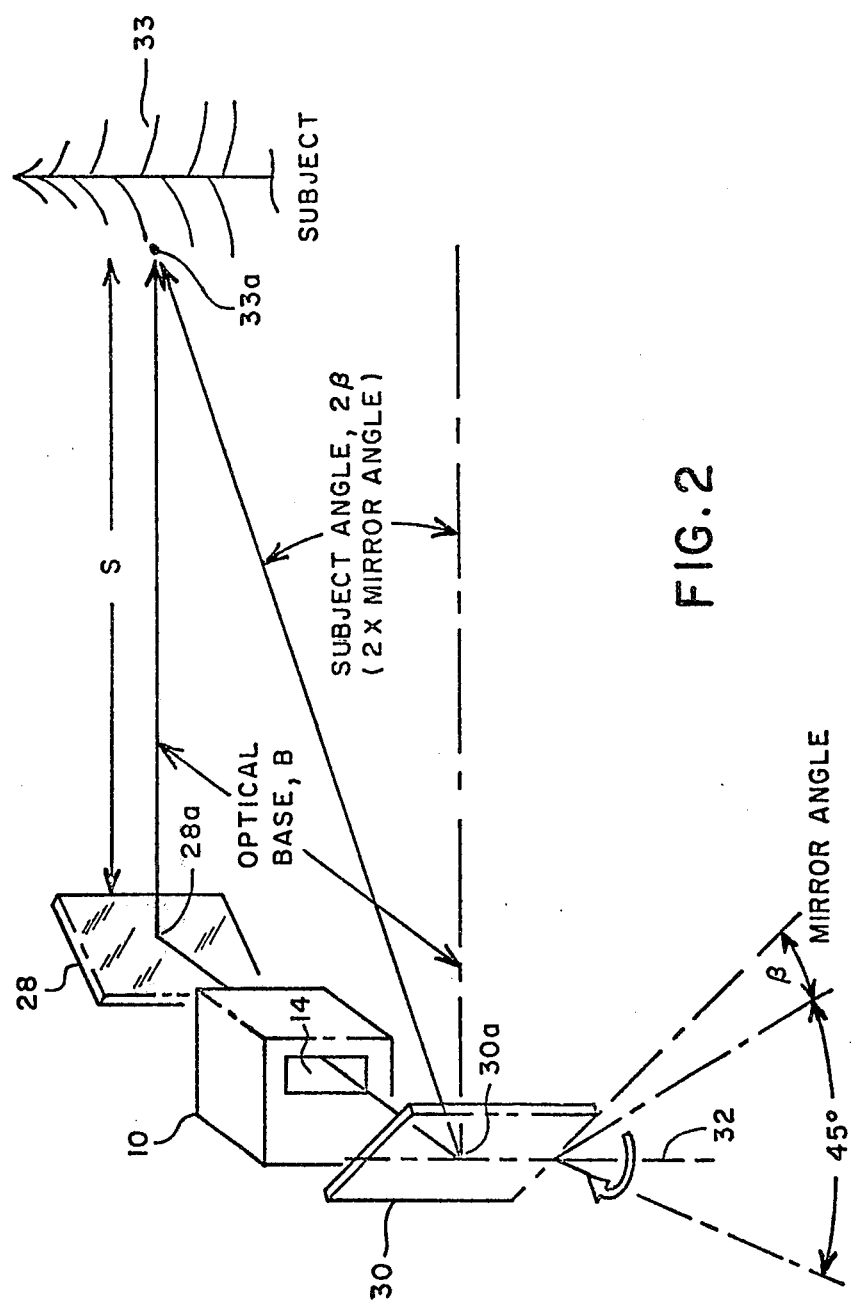
FIG. 2 shows the basic optical configuration of a system using the module of FIG. 1.

To use module 10, two mirrors 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle $2\beta$ fulfills the conditions $$\tan(2\beta) = B/S,$$

where $\beta$ is the angle through which mirror is rotated from a 45° position where light from infinity is reflected into viewing port 14. As seen in FIG. 2, angle $2\beta$ is also the angle between a line drawn from point 33a on subject 33 and point 30a on mirror 30 and a line drawn from point 33a on subject 33 and point 28a on mirror 28. B is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal.

FIG. 3 illustrates the correlation signal as a function of distance to the subject. In FIG. 3, a subject at approximately 2 meters distance from the optical system produces a peak output corresponding to that distance, as shown by the curve labelled "subject at 2M." At the infinity position mirrors 28 and 30 are each at 45°, thus directing the optical axis from each port into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two-dimensional flat scene.

Single Focus Systems

The present invention is an automatic focus system which is used in conjunction with spatial image correlation range sensing means. During a first scan, the correlation signal from the spatial image correlation range sensing means is interpreted. A position signal is also produced which indicates the position of the scanning mirror. When the major extremum of the correlation signal occurs in the first scan, the value of the position signal is stored. In the second scan, which is typically a reverse direction scan, the position signal is compared to the stored value to pick out the proper point of best focus. The lens is moved in a predetermined relationship with the scanning mirror during the second scan and is stopped when the position signal attains the stored value.

In the system of the present invention, two angular scans of mirror 30 are required. The first scan is in one direction (for example, from far to near), and in the second scan the direction of scanning mirror 30 may be reversed (for example, from near to far).

During the scanning operation, the relative positions of the radiation distributions on the first and second detector arrays 24 and 26 vary with time. The signal processing circuitry on integrated circuit 22 compares the signals from the first and second detector arrays 24 and 26 and produces a time varying correlation signal which exhibits a major extremum when the best correspondence of the radiation distributions on first and second detector arrays 24 and 26 is obtained.

The basis of the present invention is the storing of the value of the position signal when the major extremum occurs during the first scan and the use of that stored value to position the lens during the second scan. This allows the system to be implemented with a minimum of components. In addition, the present invention does not require the operation of scanning to be linear or well predicted in time.

A single focus system for a still camera is shown in basic diagram form in FIG. 4. The system includes module 10, mirrors 28 and 30, taking lens 34, film 36, single focus control electronics 38, position sensor 39, mirror and lens drive 40 and shutter 42.

Movable mirror 30 is prepositioned to an angle such that the viewing optical axis, $a'$, lies beyond the normal infinity position. At a start function command, mirror 30 is released to move first through the infinity position, $a$, and then on through to eventually reach an angular position, $c$, where the axis intercepts the fixed axis at the near subject range. It then starts its return travel back toward $a'$. The entire cycle is indicated by the top wave form in FIG. 5, which shows as a solid line the position signal from position sensor 39. Also shown as a dashed line is the stored value of the position signal, which is used to locate the proper focus position during the second scan. The second waveform in FIG. 5 indicates the corresponding correlation signal produced for this scan cycle. The correlation signal during the first scan from $a$ to $c$ is similar to that indicated in FIG. 3. The correlation signal during the second scan is clamped to zero.

An enable signal or function is provided which changes state before the start of the second scan when mirror 30 is approximately at position $c$. The enable signal may be produced by an enable switch linked to mirror 30 or may be produced electronically.

The module circuitry operates on the correlation signal to give a positive voltage logic level change at the first peak encountered and at each subsequent peak which is approximately equal to or greater than the previous indicated peak. The output from the module circuitry is termed the "output signal."

In FIG. 5, the lens extension is constant during the first scan. In other words, taking lens 34 is maintained at its near limit position until the beginning of the detection scan. Alternatively, taking lens 34 can be moved with mirror 30 during the first scan, but this increases system inertia. During the second scan, lens 34 moves in a predetermined relationship with mirror 30 until the stop command signal stops lens 34. The stop command signal is produced when the position signal during the second scan attains the stored value of the position signal when the last (and, therefore, the major) peak occurred during the first scan.

Peak Detection and Production of the Output Signal

Figure 6:
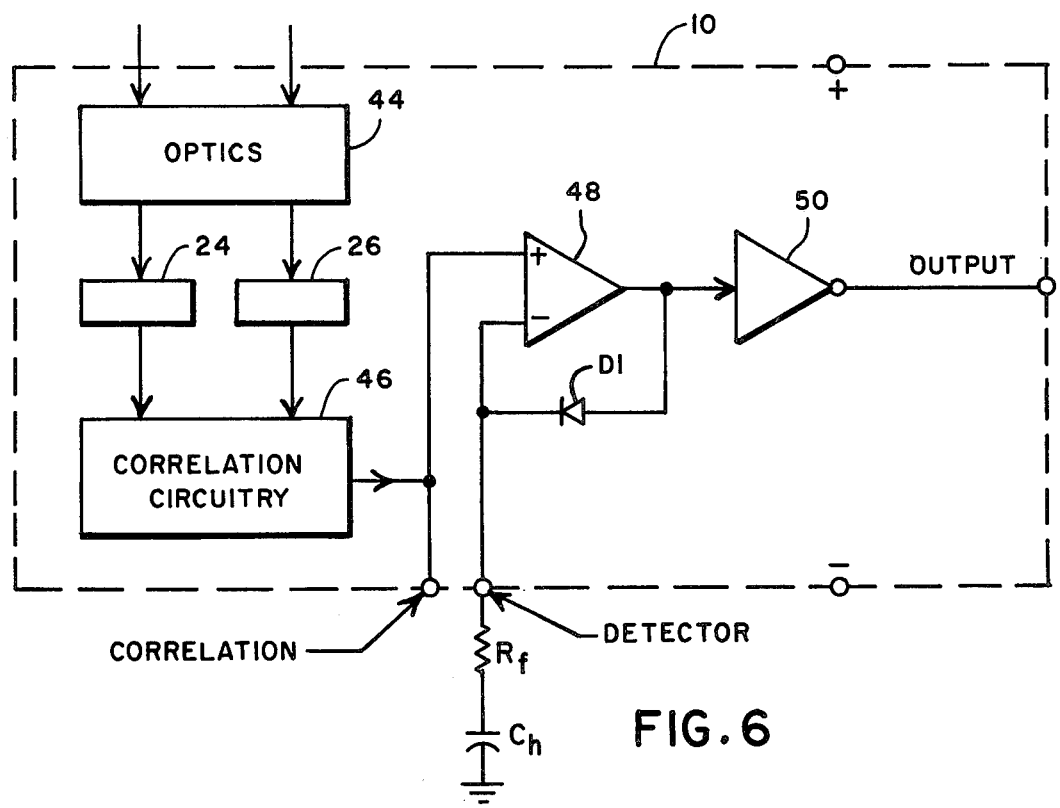
FIG. 6 shows the peak detection circuitry associated with the module of FIG. 1.

FIG. 6 shows module 10 as it is used in a preferred embodiment of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation. A terminal entitled "Correlation Signal" is provided at which the correlation signal appears.

Extremum sensing circuitry is provided in module 10 to process the correlation signal to determine when the major correlation extremum occurs. In the preferred embodiment shown in FIG. 6, the major extremum is a peak and the extremum sensing circuitry is peak detection circuitry. This circuitry includes differential amplifier 48, diode D1, inverter 50, filter resistor $R_f$, and hold capacitor $C_h$. In the embodiment shown in FIG. 6, resistor $R_f$ and capacitor $C_h$ are external components and are connected to the "Detector" terminal of module 10. Module 10 develops, at the terminal entitled "Output", a digital positive going output signal at each maxima greater than prior maxima.

Figure 7B:
FIGS. 7a and 7b show an example of the hold capacitor voltage, correlation signal, amplifier signal, and output signal produced by the module of FIGS. 1 and 6.
Figure 7A:
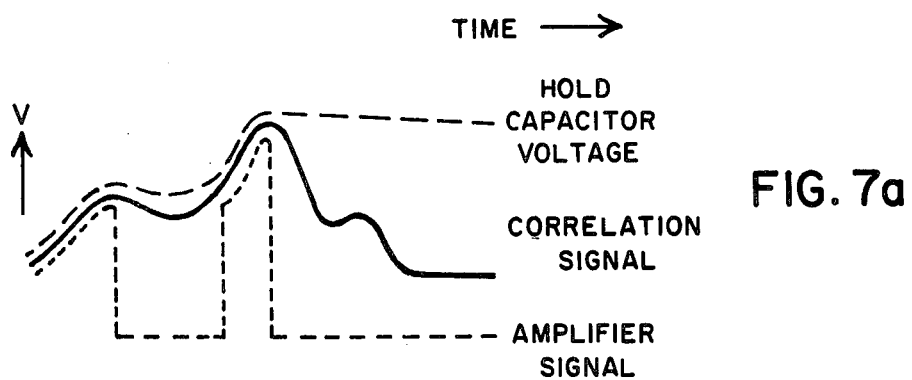

Hold capacitor $C_h$ connected to the "Detector" terminal provides a hold or comparison signal for the peak detection circuitry and to a large extent controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a peak having occurred. The amplifier signal following a complex correlation waveform is shown in FIG. 7a. FIG. 7b shows the output signal from module 10 produced for the scan of FIG. 7a.

During the first scan, which is shown in FIGS. 7a and 7b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply. The last peak detected during the first scan is the major peak which indicates the point of proper focus.

While the peak detection circuitry must be capable of accurately following the correlation signal and determining when a peak occurs, it is desirable that it at the same time be insensitive to noise on the correlation signal. Noise immunity is achieved by filter resistor $R_f$ in series with the hold capacitor $C_h$. In FIG. 6, resistor $R_f$ is external to module 10 and preferably has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states.

Single Focus Control Electronics

The last positive logic "0" to logic "1" transition in the output signal during the first scan indicates that the major correlation peak has occurred. The single focus control electronics uses the output signal and the position signal to develop a control signal capable of stopping the camera lens at the proper focus position by operation of lens drive control means such as a solenoid. The control signal operates the solenoid. Once the value of the position signal indicating proper focus is stored during the first scan, the control signal should remain independent of any change in the correlation.

In single focus systems of the present invention, an enable means or signal must be supplied. The enable means permits the camera lens position to be controlled only during the detection scan. The system should not be enabled after power is applied until the electronics have stabilized (generally about 5 milliseconds). The enable means may be a switch connected to the scan mirror or may be an electronic circuit. The focus system is enabled near the end of the first scan of the scan cycle preceding the near limit of the rotation of the scanning mirror.

Figure 8:
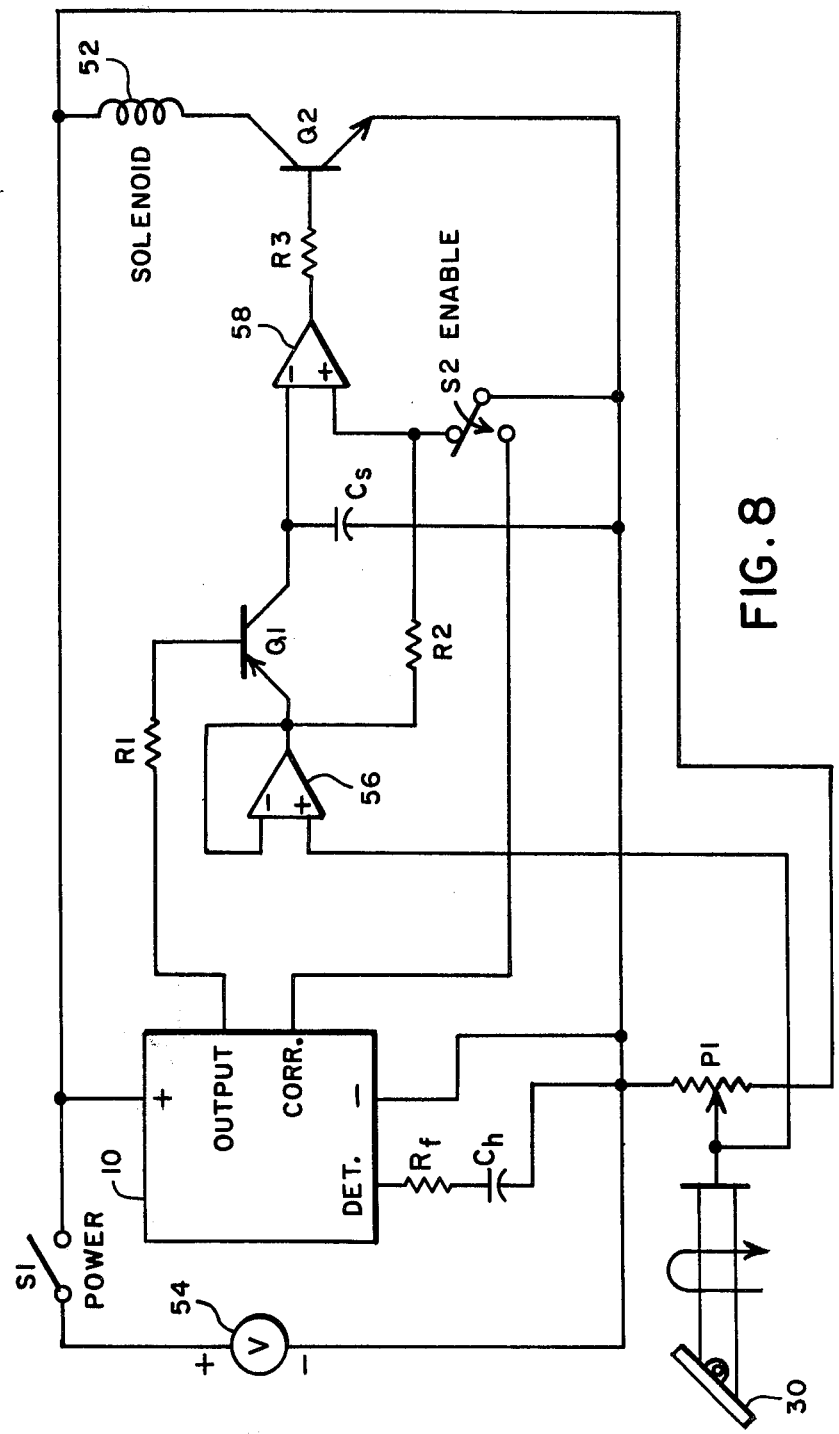
FIG. 8 is a schematic diagram of the system of the present invention.

In the operation of the auto focus system, several events must occur in sequence. The first event is the application of power. The first scan of the focus cycle is then started. Before commencement of the second scan, the single focus control electronics is enabled to allow it to compare the stored value of the position signal with the instantaneous value of the position signal. When the position signal during the second scan attains the stored value switching means in the single focus control electronics changes states, thereby energizing the solenoid which stops the motion of the camera lens or some mechanical member that ultimately controls the position of the camera lens focus. The single focus control electronics of the present invention may be implemented in a variety of forms. FIG. 8 is an example of a preferred embodiment of single focus control electronics which may be used in accordance with the present invention. The particular control electronics selected will depend on a number of factors, including cost, performance, and compatibility with other automatic features such as automatic exposure control.

The system of FIG. 8 includes module 10, filter resistor $R_f$, hold capacitor $C_h$, solenoid 52, power supply 54, resistors R1, R2, and R3, transistors Q1 and Q2, storage capacitor $C_s$, potentiometer P1 which is coupled to scanning mirror 30, buffer amplifier 56, comparator 58, power switch S1, and enable switch S2.

Prior to operation, the system is de-energized and the taking lens of camera is in a predetermined position (preferably its near limit position). Operation of the system is commenced by closing power switch S1. This supplies power to the "+" and "−" terminals of module 10 and also supplies power to the remainder of the circuitry.

The output signal from module 10 is applied through resistor R1 to the base of transistor Q1. Transistor Q1 is connected so that it is turned on when the output signal is low and is turned off when the output signal is high.

The position signal is derived from the wiper blade of potentiometer P1. Potentiometer P1 is connected so that the position signal has its maximum value when mirror 30 is in its infinity position. It has its minimum value when mirror 30 is at its near limit position.

The position signal is applied through buffer amplifier 56 to the emitter of transistor Q1. In addition, it is applied through resistor R2 to the non-inverting ("+") input of comparator 58.

When transistor Q1 is turned on, the position signal is applied through emitter-collector of Q1 to the inverting ("−") input of comparator of 58 and to storage capacitor $C_s$. The output of comparator 58 is connected through resistor R3 to the base of transistor Q2. The collector-emitter current path of transistor Q2 is connected in series with solenoid 52, which is operable to stop movement of the taking lens during the second scan when solenoid 52 is energized.

In the circuit shown in FIG. 8, enable switch S2 performs two functions. During the first scan, it is connected to clamp the non-inverting input of comparator 58 to ground. During the second scan, it allows the non-inverting input to receive the position signal while clamping the correlation signal to ground.

The operation of the system of FIG. 8 can best be described by again referring to FIG. 5. When power switch S1 is closed, power is applied to the circuit. The first scan then begins and the position signal begins to decrease from its maximum value as mirror 30 is moved.

As shown in FIG. 5, the correlation signal first exhibits a minor or false peak and the output signal rises from the low to the high state. As long as the output signal is in the low state, the stored value on capacitor $C_s$ shown by the dashed line in the top waveform of FIG. 5 exactly tracks the position signal. When the output signal goes high, the stored value of the position signal no longer can change.

When the correlation signal exceeds the previous minor peak, the output signal again goes low. It remains low until the major peak is detected at point b. The stored value again tracks the value of the position signal while the output signal is low.

When the major peak at point b is detected, the output signal again goes high. Since no greater peak is detected during the remainder of the first scan, the output signal remains high. During the second scan, the correlation signal is clamped to zero by enable switch S2. As a result, the output signal remains high throughout the entire second scan.

When the output signal goes high for the last time, the stored value remains constant because transistor Q1 is never turned on again. This stored value corresponds to the position signal at the occurrence of the major peak. This stored value can be used, therefore, to identify the correct focus position during the second scan.

During the first scan, the output of comparator 58 is always low because enable switch S2 has clamped the non-inverting input of comparator 58 to ground. Q2 is turned off and solenoid 52 is de-energized, therefore, throughout the entire first scan.

At the end of the first scan, enable switch S2 switches, thereby allowing the position signal to be applied to the non-inverting input of comparator 58. In addition, the switching of enable switch S2 causes the correlation signal to be clamped to zero throughout the second scan. This prevents the output signal from switching to the low state and turning on transistor Q1 at any time during the second scan.

During the second scan, the taking lens is moved from the near field position limit toward the infinity position limit in a predetermined relationship and at the same rate as the scanning mirror 30 is being moved. When solenoid 52 turns on, motion of the taking lens (and in many cases also the scanning mirror) is halted. The taking lens, therefore, has been positioned at the point of proper focus.

Solenoid 52 is energized during the second scan when the position signal being applied to the non-inverting input of comparator 58 attains and exceeds the stored value which is applied to the inverting input. At the beginning of the second scan, mirror 30 is at its near limit position and the position signal is at a minimum. As mirror 30 begins to scan toward the infinity position, the position signal begins to rise. Comparator 58 changes state, thereby turning on transistor Q2 and energizing solenoid 52, when the position signal exceeds the stored value.

It can be seen that the present invention does not require scanning which is either linear or well-predicted in time. The movement of the lens during the second scan is stopped when the position signal attains the stored value no matter how fast or slow the scanning mirror is moved during the second scan. This greatly relaxes the requirements for the mirror and lens drive.

The mirror and lens drive required for the present invention may be implemented in a variety of different manners. The particular mechanical systems selected will depend on size, weight, cost, and other considerations. An example of mechanical systems which may be adapted for use with the present invention are described in a co-pending patent application by Dean M. Peterson entitled "Motion Producing Means," Ser. No. 728,565 filed Oct. 1, 1976 which is assigned to the same assignee as the present invention.

Conclusion

The single focus automatic focus system of the present invention provides reliable focusing of a camera lens with minimum electrical and mechanical complexity. In addition, reliability is improved since the operation of scanning need not be linear or well-defined in time.

While the present invention has been disclosed with the reference to a series of preferred embodiments, workers skilled in the art will recognize that changes may be made in form and detail without departing from the spirit and scope of the invention.

The embodiments of the invention in which an exclusive property or right is claimed are defined as follows:
1. An optical system comprising:
   lens means for providing a primary image of an object;
   scanning means for providing first and second scans of an auxiliary image of the object;
   range sensing means for receiving the auxiliary image and providing a correlation signal having a major extremum during the first scan;
   position sensing means for providing a position signal indicative of the position of the scanning means;
   storing means for storing the value of the position signal when the major extremum occurs during the first scan;
   lens drive means for moving the lens means in a predetermined relationship with the scanning means during the second scan; and focus control means for halting motion of the lens means during the second scan when the position signal attains the value stored by the storing means.

2. The optical system of claim 1 and further comprising:

extremum sensing means for receiving the correlation signal and providing an output signal with changes from a first to a second state during the first scan upon the occurrence of each extremum which is more extreme than previous extrema, the last change of state of the output signal from the first to the second state being indicative of the occurrence of the major extremum.

3. The optical system of claim 2 wherein the focus control means comprises:

first switching means for switching from a third to a fourth state when the position signal attains the value stored by the storing means;

lens drive control means for halting motion of the lens means when the first switching means switches to the fourth state; and first enable means for preventing the first switching means from switching during the first scan and enabling the switching means to switch during the second scan.

4. The optical system of claim 3 wherein the lens drive control means comprises solenoid means.

5. The optical system of claim 4 wherein the solenoid means causes the motion of the lens means to be halted when the solenoid means is energized.

6. The optical system of claim 3 wherein the first switching means comprises comparator means having a first input which receives the position signal during the second scan and a second input which receives the stored value from the storing means.

7. The optical system of claim 6 wherein the first enable means prevents the position signal from being applied to the first input during the first scan and allows the position signal to be applied to the first input during the second scan.

8. The optical system of claim 3 and further comprising:

second switching means for permitting the values stored by the storing means to change with changes in the instantaneous value of the position signal when the output signal has the first state and preventing the value stored by the storing means from changing with changes in instantaneous value of the position signal when the output signal has the second state; and second enable means for preventing the second switching means from permitting change in the value stored by the storing means during the second scan.

9. The optical system of claim 8 wherein the second enable means clamps the correlation signal during the second scan.

10. The optical system of claim 8 wherein the second switching means has a control electrode and first and second main current carrying electrodes and wherein the control electrode receives the output signal, the first main current carrying electrode receives the position signal and the second main current carrying electrode is connected to the storing means.

11. The optical system of claim 10 wherein the storing means comprises capacitor means.

12. The optical system of claim 1 wherein the scanning means comprises a scanning mirror and wherein the position sensing means comprises a potentiometer coupled to the scanning mirror means.

13. In a camera having taking lens means, an automatic focus system for positioning the taking lens means prior to taking of a photograph, the automatic focus system comprising:

scanning means for providing first and second scans;

range sensing means for producing an output signal when the scanning means is in a position corresponding to a desired range during the first scan;

position sensing means for providing a position signal indicative of the position of the scanning means;

storing means for storing the value of the position signal when the range sensing means produces the output signal during the first scan;

lens drive means for moving the taking lens means in a predetermined relationship with the scanning means during the second scan; and focus control means for halting motion of the taking lens means during the second scan when the position signal attains the value stored by the storing means.

* * * * *